Nov. 7, 1967  G. R. ANDERSON  3,351,114
METHOD AND APPARATUS FOR PROCESSING FRUIT
Original Filed July 2, 1962  11 Sheets-Sheet 1
FIG_1
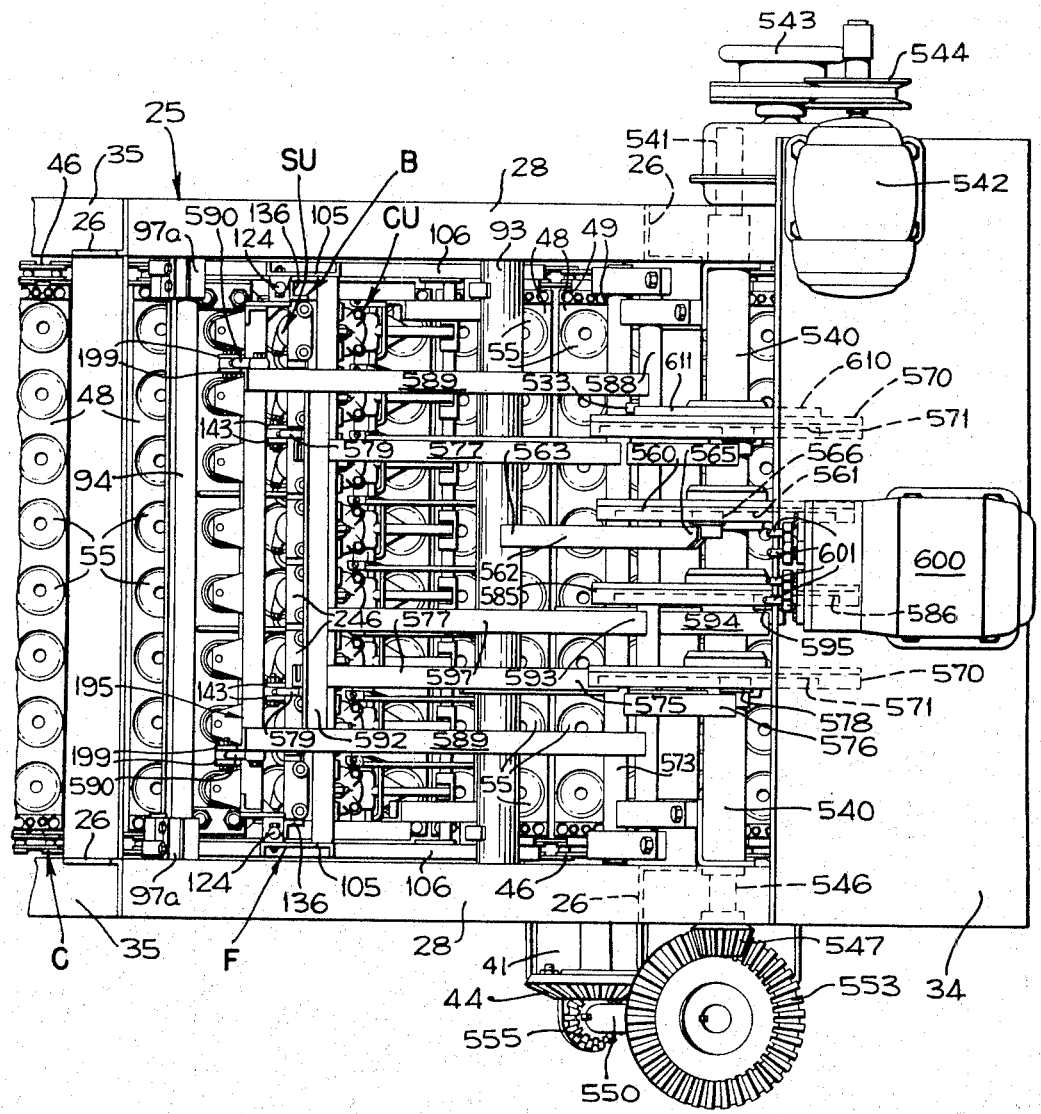
INVENTOR
GERALD R. ANDERSON
BY *Francis W. Anderson*
ATTORNEY

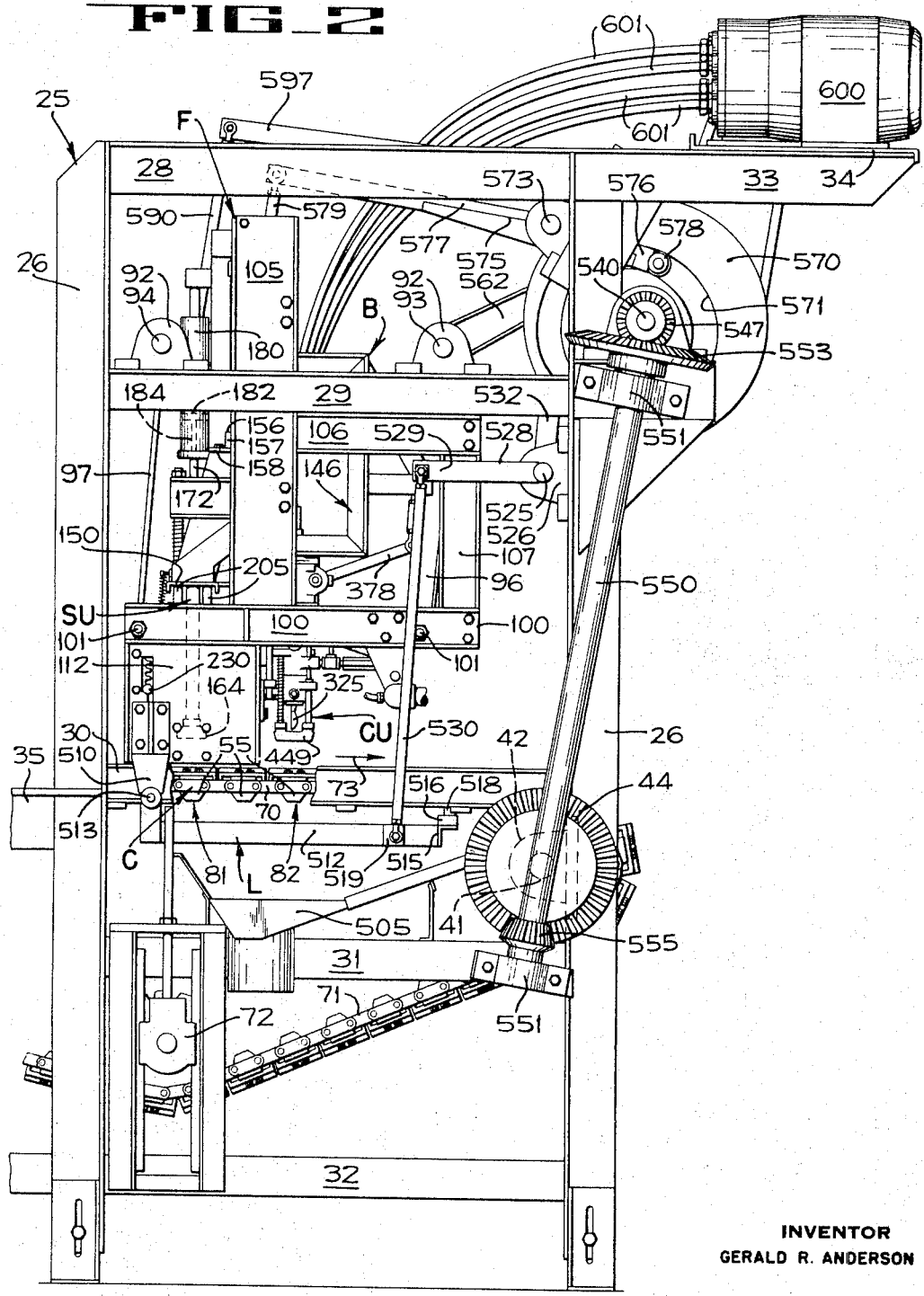

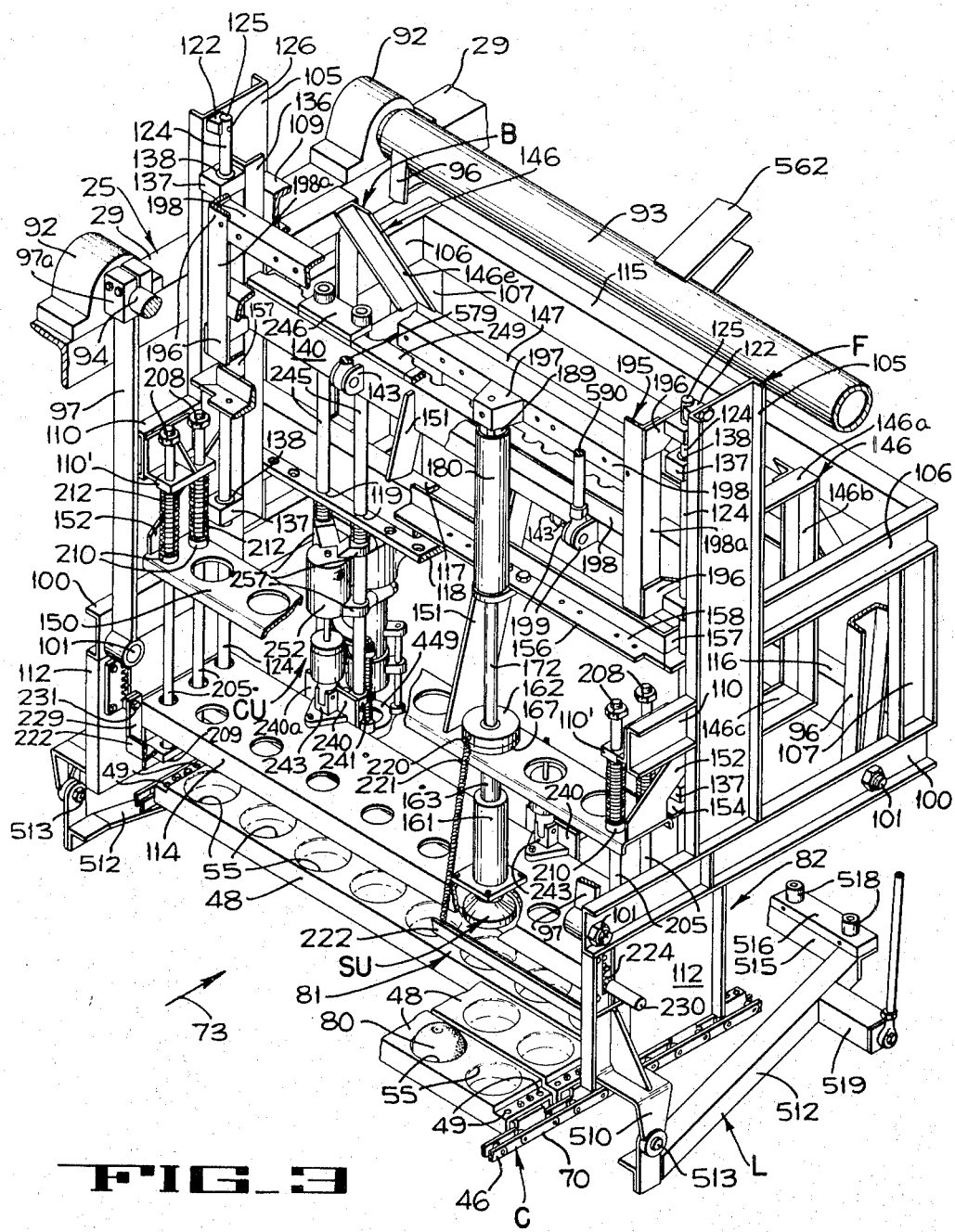

Nov. 7, 1967  G. R. ANDERSON  3,351,114
METHOD AND APPARATUS FOR PROCESSING FRUIT
Original Filed July 2, 1962  11 Sheets-Sheet 4
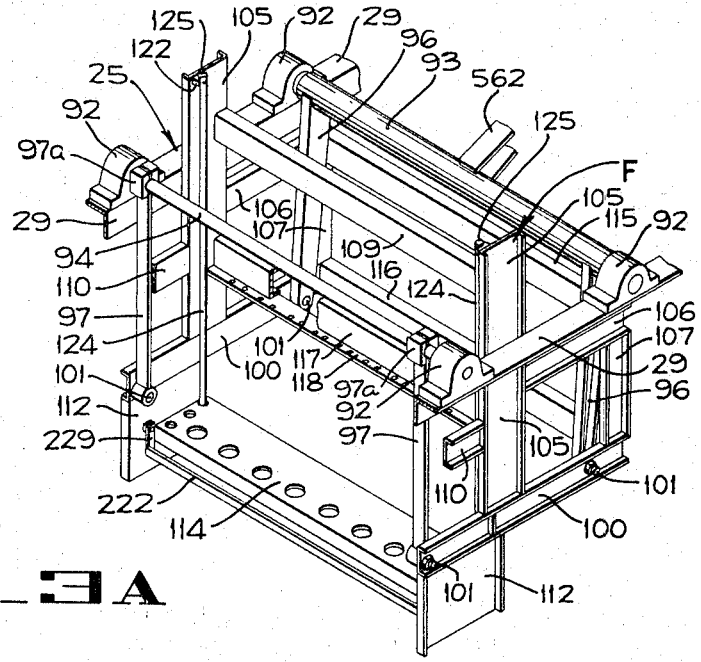
FIG_3A
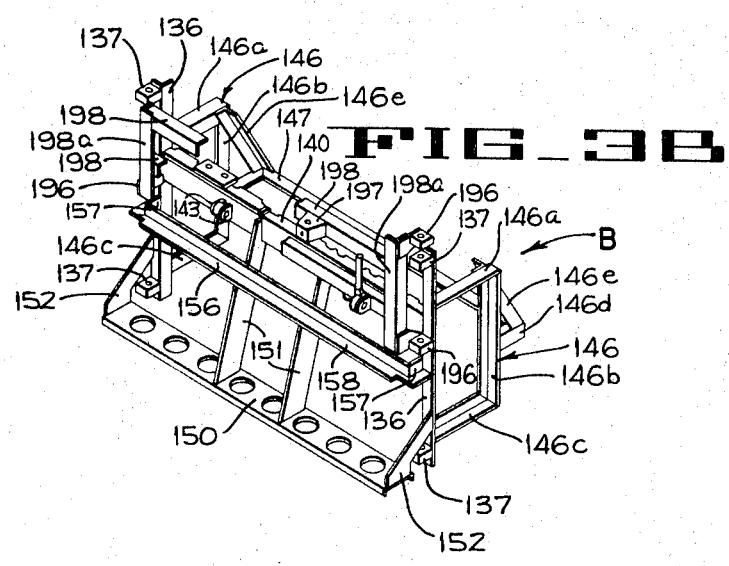
FIG_3B
INVENTOR
GERALD R. ANDERSON
BY *Francis W. Anderson*
ATTORNEY Nov. 7, 1967  G. R. ANDERSON  3,351,114
METHOD AND APPARATUS FOR PROCESSING FRUIT
Original Filed July 2, 1962  11 Sheets-Sheet 5
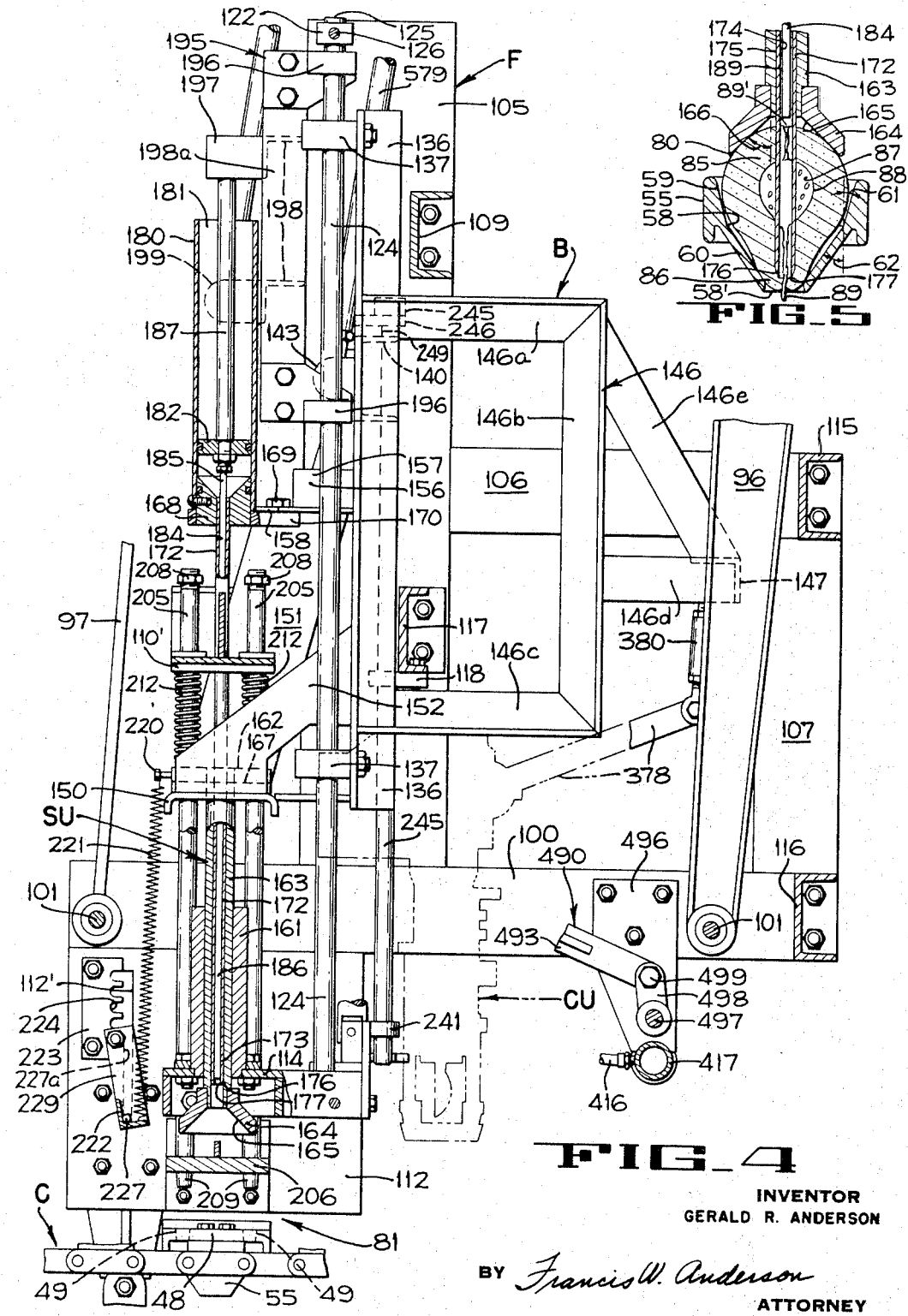
FIG_5
FIG_4
INVENTOR
GERALD R. ANDERSON
BY Francis W. Anderson
ATTORNEY

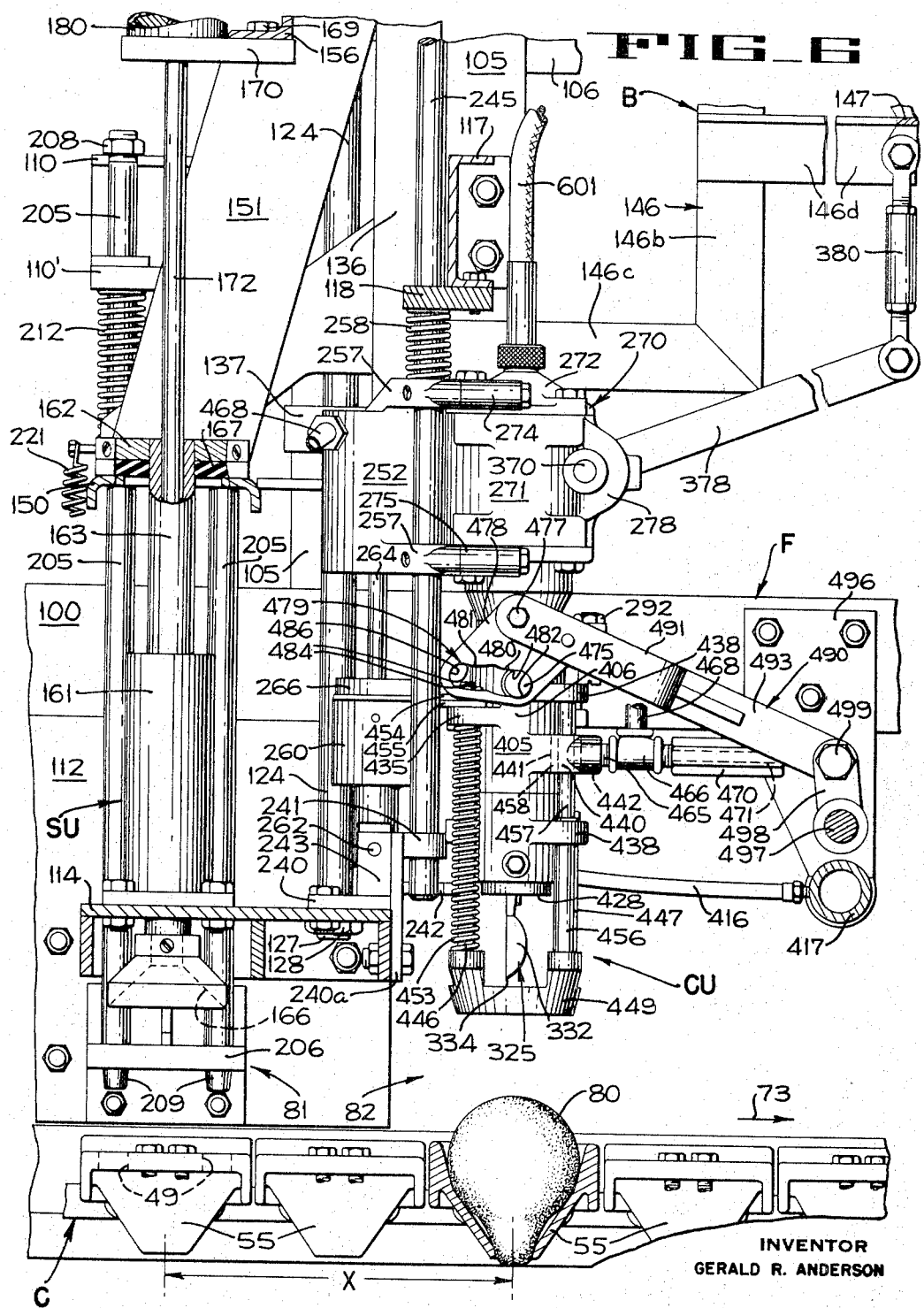

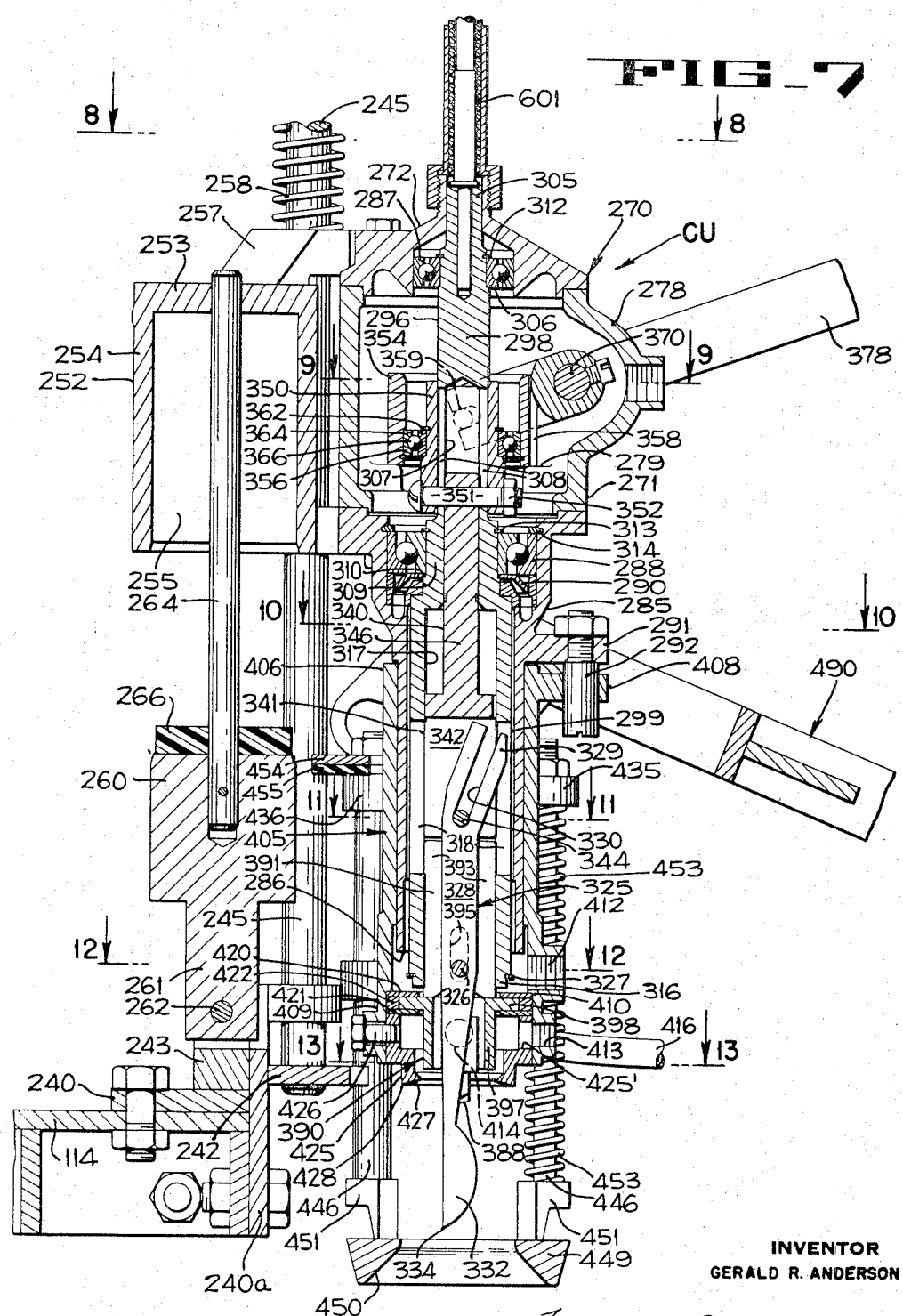

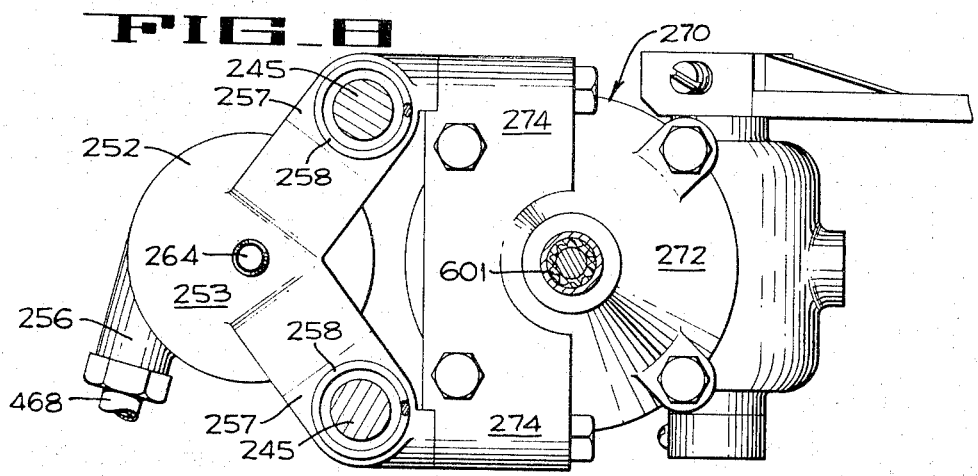
FIG_8
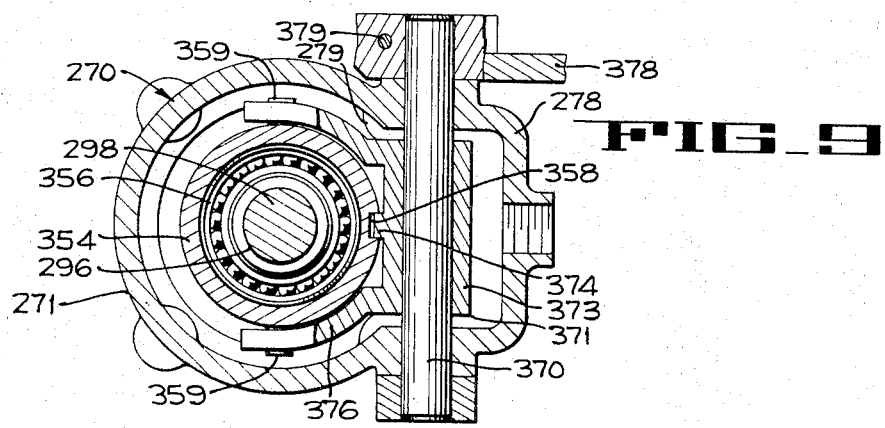
FIG_9
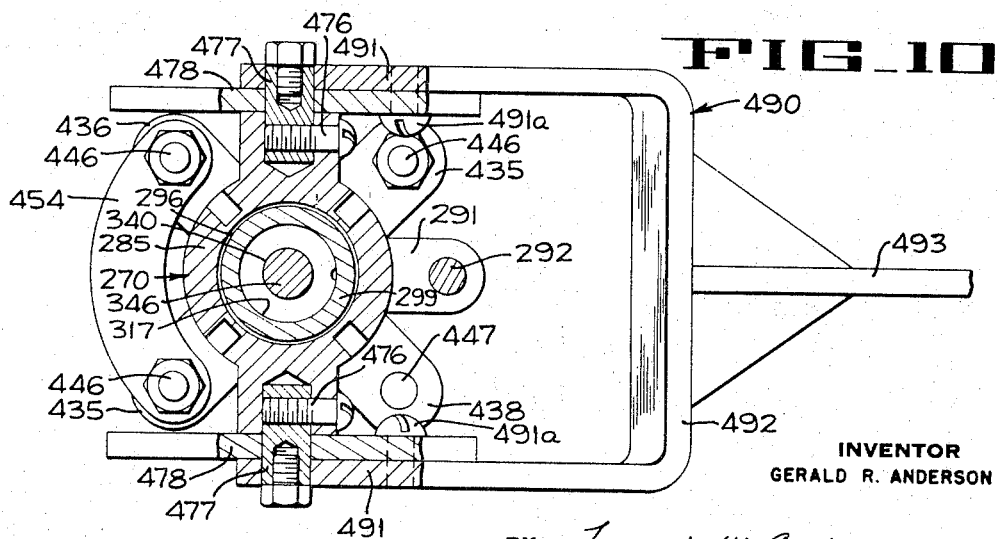
FIG_10
INVENTOR
GERALD R. ANDERSON
BY Francis W. Anderson
ATTORNEY

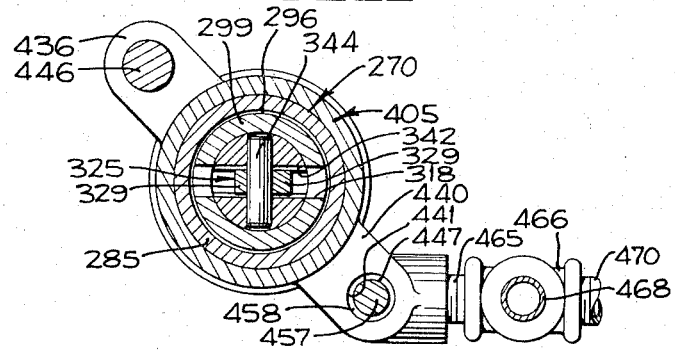
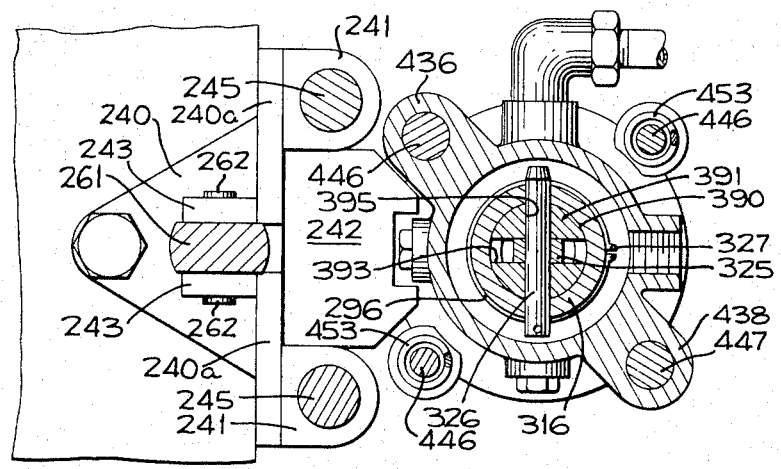
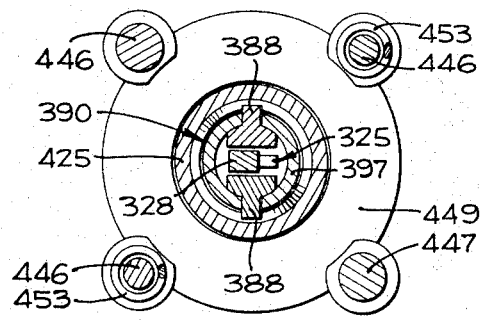

Nov. 7, 1967   G. R. ANDERSON   3,351,114
METHOD AND APPARATUS FOR PROCESSING FRUIT
Original Filed July 2, 1962   11 Sheets-Sheet 10

INVENTOR
GERALD R. ANDERSON
BY Francis W. Anderson
ATTORNEY

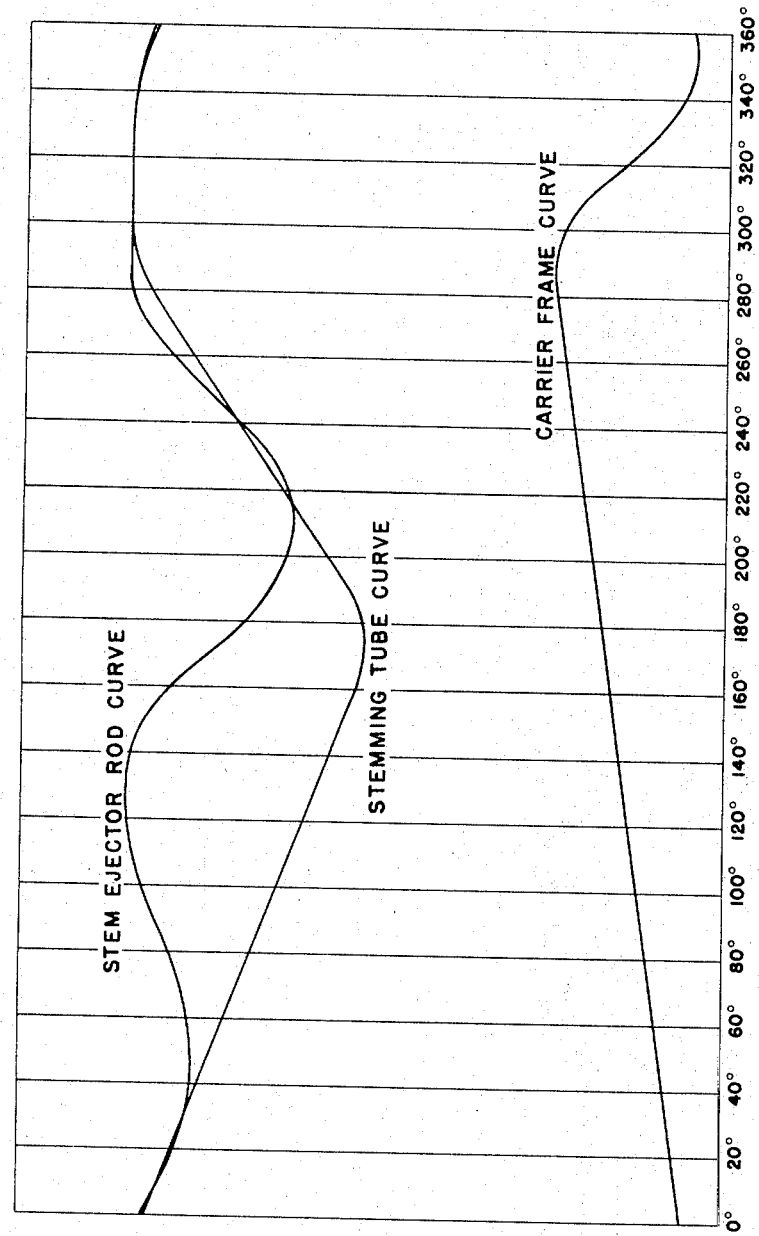

United States Patent Office 3,351,114
Patented Nov. 7, 1967

3,351,114
METHOD AND APPARATUS FOR PROCESSING FRUIT
Gerald R. Anderson, Campbell, Calif., assignor to FMC Corporation, San Jose, Calif., a corporation of Delaware
Original application July 2, 1962, Ser. No. 206,955, now Patent No. 3,246,676, dated Apr. 19, 1966. Divided and this application Mar. 26, 1965, Ser. No. 452,432
6 Claims. (Cl. 146—238)

This application is a division of Ser. No. 206,955, July 2, 1962, now Patent No. 3,246,676.

The present invention pertains to a method of and apparatus for processing fruit and, more particularly, to a method and apparatus for stemming and coring fruit accurately and without damaging the fruit.

It has been known in the past to stem fruit mechanically, that is, to cut out a cylindrical, central segment of a fruit, such segment, including the stem and the tough fibrous flesh immediately surrounding the stem. One of the problems with mechanical stemming of fruit in accordance with the prior art has been the damage of an end portion, usually the stem end portion, of the fruit. Thus, with a pear supported with its stem end down, it has been conventional to force a sharpened tube into the butt end of the pear and thence entirely through the pear along the stem-blossom axis. Quite frequently, the stemming tube has broken off a substantially conical segment of the pear at its stem end before the tube is entirely through the fruit. This irregular breakage of the fruit damages it so that it is commercially unacceptable.

Stem end breakage during stemming is minimized in the present invention by applying suction to the stem end portion in a direction opposite to the direction of movement of the stemming tube. By this suction, the stem end portion is maintained integral with the rest of the pear, or other fruit, the stem end is not broken off, and a clear cut is made through the fruit by the stemming tube.

Another object is to provide a method and apparatus for stemming fruit without undesirable breakage of portions of the fruit.

Another object is to provide a method and apparatus for processing fruit in a minimum of time and with a minimum of labor.

These, together with other objects, will become apparent upon reference to the following description and accompanying drawings, in which:

FIG. 1 is a more or less schematic plan of a fruit processing apparatus embodying the principles of the present invention.

FIG. 2 is a side elevation of the apparatus illustrated in FIG. 1, said apparatus including stemming and coring units which are seen in FIG. 2.

FIG. 3 is an enlarged, schematic fragmentary isometric of a portion of the apparatus in FIG. 2 showing only one stemming unit and one coring unit and with parts being broken away for illustrative clarity.

FIGS. 3A and 3B are schematic isometric views of an oscillating frame and vertically reciprocating brackets, respectively, used in the apparatus of FIG. 1.

FIG. 4 is an enlarged, fragmentary, vertical section of the apparatus of FIG. 1 showing, in particular, details of a stemming unit and showing only an outline of a coring unit.

FIG. 5 is an enlarged, fragmentary vertical section of a lower portion of a stemming unit as it operates on a pear to remove the stem thereof.

FIG. 6 is an enlarged, fragmentary vertical section of the apparatus of FIG. 1 showing a stemming unit and a coring unit but incorporating more of the details of the coring unit than in FIG. 4.

FIG. 7 is a still further enlarged, fragmentary, longitudinal section of a coring unit as employed in the subject apparatus.

FIG. 8 is an enlarged, transverse section taken on a plane at a position represented by line 8—8 in FIG. 7.

FIG. 9 is an enlarged, transverse section taken on a plane at a position represented by line 9—9 in FIG. 7.

FIG. 10 is an enlarged, transverse section taken on a plane at a position represented by line 10—10 in FIG. 7.

FIG. 11 is an enlarged transverse section taken on a plane at a position represented by line 11—11 in FIG. 7.

FIG. 12 is an enlarged transverse section taken on a plane at a position represented by line 12—12 in FIG. 7.

FIG. 13 is an enlarged transverse section taken on a plane at a position represented by line 13—13 in FIG. 7.

FIG. 14 is an enlarged, fragmentary longitudinal vertical section of the apparatus of FIG. 1 showing one of the coring units as it cores a relatively large pear.

FIG. 15 is a view similar to FIG. 14 but showing the coring unit as it cores a relatively small pear.

FIG. 16 is a cam chart showing the relationships between the carrier frame, the stemming tube, and the stem ejector rod, all as used in the subject apparatus, during one cycle of operation of the apparatus.

Before describing the detailed structure of the present apparatus, it will be helpful to point out certain main components of the apparatus and their general association. Thus, with reference to FIGS. 2 and 3, a fruit supply conveyor C continuously conveys fruit 80 past stemming and coring stations 81 and 82 in the direction of arrow 73. A carrier frame F swings fore and aft above the conveyor in timed relation to the conveyor and mounts a main support bracket B which moves up and down in timed relation to the movements of the carrier frame. A stemming unit SU is mounted on the main support bracket and thus moves upwardly and downwardly with this bracket so as to stem fruit at the stemming station. A coring unit CU is supported by the main support bracket which lowers the coring unit at the coring station into coring position in a stemmed fruit and subsequently lifts the coring unit into retracted position. After the fruit is cored, it is discharged by the conveyor, but, just prior to discharge, it is unseated from the conveyor by a fruit lifter L.

Referring in greater detail to the drawings and to the subject apparatus, a main frame 25 (FIGS. 1 and 2) is provided having pairs of front and rear legs 26 (FIG. 2) on opposite sides of the frame. The frame also provides horizontal upper side braces 28; intermediate side braces 29, 30 and 31; and lower side braces 32 which rigidly interconnect front and rear legs on corresponding sides of the frame. The upper braces include forwardly projecting motor support portions 33 and a horizontal platform 34 is mounted on these support portions. The frame also includes a conveyor support portion 35, which is only partially illustrated at the lower left in FIG. 2. In actual embodiments of the present invention, the conveyor support portion projects rearward from the rear legs a distance equal to about twice the distance between the front and rear legs of the frame.

Conveyor

The fruit supply conveyor C (FIGS. 1, 2 and 3) is mounted in the frame 25 and includes a substantially horizontal, forward drive shaft 41 (FIG. 2) journalled in bearings 42 secured to the front legs 26. The drive shaft is extended transversely of the frame and is vertically spaced between the intermediate braces 30 and 31. A driven bevel gear 44 is secured to an end of the drive shaft, and front sprockets, not shown, are keyed to opposite end portions of the drive shaft. Endless chains 46 are trained around the front sprockets and also around rear sprockets, not shown, the latter being mounted on a rear shaft, not shown, but supported on the conveyor support portion 35 in rearwardly spaced relation to the rear legs 26. Elongated flights 48 (FIG. 3) interconnect the chains and extend transversely of the frame, with each flight having a pair of aligned holes 49 in each end portion thereof.

The fruit conveyor C also includes a plurality of fruit supporting cups 55 (FIG. 1) integrally formed in each of the transverse flights 48. The cups of each flight constitute a row of cups extending transversely of the conveyor with the spacing between adjacent cups in each row being substantially the same. Considering all of the flights, there are a plurality of lanes of cups with each lane including longitudinally aligned cups of the several flights and with the spacing between adjacent cups in each lane being substantially the same. The illustrated embodiment of the subject invention provides eight lanes of cups, but it is to be understood that the invention is not limited to this number of lanes nor even to a plurality of lanes.

The configuration of each fruit supporting cup 55 has significance and is best illustrated in FIG. 5. Each cup has an inverted, frusto-conical, inner wall 58 circumscribing an upper fruit receiving socket and a lower opening 58'. The inner wall is divided into upper and lower portions 59 and 60, respectively, defining acute angles 61 and 62 with a vertical line. Although angles 61 and 62 of respectively fifteen and thirty-five degrees have proved to be successful, the invention is not limited to these specific angles.

Returning now to other features of the fruit conveyor C (FIG. 2), it has an upper horizontal run 70 positioned between the intermediate side braces 30 and a lower run 71 extending rearward from the front sprockets around a chain tightener 72 (FIG. 2) to the rear sprockets, not shown, on the support portion 35. The conveyor is driven, in a manner to be described, so as to move the upper run in a forward direction, as indicated by the arrow 73.

The upper run 70 of the described conveyor C is employed to carry fruit 80 (FIG. 3) past stemming and coring stations 81 and 82, respectively, (FIGS. 2 and 3) above the conveyor. Although the principles of the subject invention are applicable to various fruits, the present embodiment is conveniently described as applied to the stemming and coring of pears. For identification and subsequent reference, each pear (FIG. 5) to be processed has a blossom or butt end 85, an opposite stem end 86, an internal seed cell 87 located within a core cavity or pocket 88, and a stem 89. The pears are individually supported in the cups 55 with their stem ends down. If the stem ends of these pears are sufficiently narrow, they project through the openings 58'.

It is of interest to note that in actual practice of the subject invention, the pears 80 are peeled before being stemmed and cored and are automatically fed into the cups 55. Of course, the pears can be manually placed in the cups by attendants, not shown, standing alongside of the conveyor support portion 35 (FIG. 1). Also, although the pears need not be peeled prior to stemming and coring according to the subject invention, peeling, especially if by lye dipping, does make them slippery, a characteristic that aids in positioning the pears in their cups. That is, as each pear travels on the conveyor toward the stemming station 81, it lies against its respective cup wall 58 (FIG. 5) with its stem blossom axis usually slightly inclined with respect to the vertical axis of the cup. In a manner to be subsequently described, each pear is moved into coaxial alignment with its cup axis during the stemming and coring operation and surface slipperiness does facilitate such movement.

*Carrier frame*

The carrier frame F (FIG. 3) is supported by the main frame 25 above the upper run 70 of the fruit conveyor C for forward and rearward oscillating movement. The carrier frame extends the full width of the conveyor and is located above the stemming and coring stations 81 and 82. For supporting the carrier frame, front and rear pairs of pillow blocks 92 are mounted on the intermediate side braces 29 with the blocks of each pair being in alignment with each other. Parallel front and rear rock shafts 93 and 94 are journalled respectively in the front and rear blocks, the front shaft 93 being in the form of a large diameter tube having stub shafts welded in its ends. Two channel shaped support arms 96 are welded to and project downwardly from the front shaft 93 while two flat, strap-like support arms 97 depend from the rear shaft 94, each arm 97 having a split hub 97a secured to the shaft 94.

The carrier frame F includes a pair of lower horizontal side channels 100 respectively adjacent to opposite sides of the main frame 25. Each side channel is pivotally connected to the lower ends of the front and rear arms 96 and 97 on its respective side of the main frame by means of short shafts, 101, each shaft having a large diameter portion providing a shoulder that abuts one face of the associated channel 100 and a threaded portion which receives a nut to lock the shaft on the channel. The arms, the side braces 29, and the side channels 100 are in a parallelogram relationship (FIG. 2) so that during said oscillating movement of the carrier frame, the side channels are maintained horizontal.

The carrier frame F (FIG. 3) also has a pair of main upstanding side channels 105 rigidly secured to and upwardly extending from the lower side channels 100, upper horizontal struts 106 forwardly projecting from the side channels 105, and front upstanding struts 107 rigidly interconnecting the horizontal struts and the lower side channels on opposite sides of the frame. It is to be observed that the swinging frame formed by the side channels and the struts is spaced inward of the intermediate side braces 29. An upper spacer channel 109 rigidly interconnects the upstanding side channels adjacent to their upper ends and extends transversely of the conveyor C. Rear horizontal aligner mounting channels 110 are secured to the upstanding side channels and project rearward therefrom in upwardly spaced relation to the lower side channels 100.

Lower side panels 112 are rigidly connected to and project downward from the rear portions of the lower side channels 100. The panels are in common vertical planes with the side channels 100 and 105, the struts 106 and 107, and the conveyor chains 46 on their respective sides of the frame F. A lower horizontal mounting channel 114 extends transversely above the conveyor C and rigidly interconnects the panels.

With continued reference to the carrier frame F, a pair of transverse channels 115 and 116 rigidify the forward end of the frame, and a horizontal upper guide channel 117 rigidly interconnects the upstanding side channels 105 and is in parallel relation to and below the upper spacer channel 109. An upper guide bar 118 is secured to the guide channel and extends the full width of the carrier frame. The guide bar provides a plurality of pairs of circular openings 119 spaced longitudinally therealong.

Upper mounting blocks 122 are secured to the inside surfaces of the upstanding side channels 105 adjacent to their upper ends. Elongated vertical guide rods 124 have upper ends 125 secured to the mounting blocks by bolts 126 and lower threaded ends 127 secured by nuts 128 (FIG. 6) to the lower mounting channel 114. The guide rods are fixed in the carrier frame in a common vertical plane which is disposed substantially normal to and transversely of the conveyor C.

*Main support bracket*

The main support bracket B (FIGS. 1 and 3) is mounted for elevational movement on the guide rods 124 of the carrier frame F. This bracket includes a pair of upstanding angle members 136 individually disposed inwardly adjacent to the upstanding side channels 105. Upper and lower holders 137 (FIG. 3) are secured to each angle member 136 and mount vertically aligned bushings 138 therein, the bushings being slidably fitted on the adjacent guide rods 124. A horizontal, coring unit support channel 140 rigidly interconnects the angle members 136 between the upper and lower holders 137 and extends transversely above the conveyor, and two pairs of spaced cars 143 (FIGS. 1 and 3) project rearwardly from this channel.

The main support bracket B (FIG. 3) also includes a pair of actuator support portions 146 each of which is made up of three-angle bars 146a, 146b and 146c (FIG. 4) rigidly secured together and projecting forward from one of the angle members 136 in a substantially common plane therewith. A horizontal, actuator support bar 147 (FIG. 4) extends transversely between the support portions 146 being rigidly secured to a horizontal brace 146d and an inclined brace 146e of each portion 146.

In addition, the main support bracket B provides a horizontal upper mounting channel 150 positioned above the lower mounting channel 114 of the carrier frame F. The upper mounting channel is supported in this position by inner and outer, rigid support straps 151 and 152. The two outer straps 152 have lower ends secured to the upper mounting channel 150 and upper ends individually secured to the angle members 136 on their respective sides of the support bracket. The two inner straps 151 have lower ends secured to the upper mounting channel 150 and upper ends secured to the coring unit support channel 140. Horizontal gussets 154 interconnect the lower ends of the angle members 136 and the upper mounting channel 150 for imparting rigidity to the structure. As seen in FIG. 2, above the upper mounting channel 150, the main support bracket B has a horizontal, stemming tube mounting bar 156 which has opposite upright end flanges 157 connected to the angle members 136 of the main bracket and a horizontal flange 158 in spaced parallel relation to, but silghtly forward of, the upper mounting channel 150.

From the foregoing, it is evident that the main support bracket B is elevationally adjustable on the carrier frame F and is supported for forward and rearward oscillating movement with the carrier frame. Therefore, as the carrier frame swings back and forth with the arm 96 and 97, corresponding swinging movement is imparted to the channel 114 and the side panels 112 of frame F, and to the mounting channel 150, the stemming tube mounting bar 156, and the coring unit support channel 140 of bracket B. The swinging movement of the carrier frame and the main bracket is, of course, over the stemming and coring stations 81 and 82 and the upper run 70 of the fruit conveyor C. Attention is now directed to the apparatus provided by the subject invention for stemming the fruit 80.

*Stemming units*

The several stemming units SU, (FIG. 3) for cutting out the stems 89 of the fruit 80, are mounted on the main support bracket B. The stemming units move up and down the main bracket and back and forth with the carrier frame F. The number of stemming units corresponds to the number of lanes of fruit supporting cups 55; therefore, in the disclosed embodiment, there are eight stemming units. Inasmuch as all of the stemming units are of identical construction and are similarly mounted in the bracket B, only one such unit is specifically illustrated in FIG. 3 and described herein.

Thus, each stemming unit SU (FIG.4) includes an upstanding guide sleeve 161 secured to the lower mounting channel 114 with its axis in a vertical plane passing through its corresponding lane of fruit supporting cups 55. A tubular shank 163 projects through the upper mounting channel 150 of the main support bracket B, is secured to a seater lifter plate 162 above the mounting channel 150, and is slidably extended downward through the guide sleeve 161. A cushion 167 is secured to the underside of the lifter plate 162 for cushioned engagement of the plate with the mounting channel. A fruit centering and seating cup 164 is secured to the lower end of the shank 163 beneath the lower mounting channel 114 and provides an inner, frusto conical wall 165 circumscribing a socket. Preferably, the wall of the seating cup defines an angle 166 (FIG. 5) of approximately forty-five degrees with a vertical; however, as in the case of the fruit supporting cups 55, the invention is not limited to the specified angle of the inner wall. When its coaction with the fruit supporting cup is described hereinafter, the importance of the construction of the seating cup will be appreciated.

Each stemming unit SU (FIG. 4) is also provided with a mounting head 168 secured to the mounting bar 156 of the main support bracket B by a bolt 169 extended through an ear 170 on the head and through the flange 158. An elongated stemming tube 172, which has an upper end secured to the mounting head 168, is slidably fitted down within the shank 163, and has a lower fruit penetrating end 173. The stemming tube (FIG. 5) provides inner and outer cylindrical walls 174 and 175, the outer wall providing a lower, downwardly convergent, frusto-conical bevel 176 terminating in a lower knife edge 177.

Still considering one of the stemming units SU, a stem ejection cylinder 180 (FIG. 4) is rigidy connected to the mounting head 168; is upwardly extended therefrom in coaxial relation with the stemming tube 172; and has an open upper end 181. A piston 182 is slidably fitted in air-tight relation within the cylinder for elevational reciprocating movement therein. An ejector rod 184 of solid cross section has an upper end 185 secured to the piston, is axially slidably received within the stemming tube, and provides a lower end 186 near the lower end 173 of the stemming tube. A piston rod 187 is secured to the piston and extends upward from the upper end of the cylinder.

It is an important feature of this invention that the stemming tube 172 and the ejector rod 184 are in minute, circumferentially spaced relation to each other (FIG. 5) so that an annular air passage 189 is provided therebetween. As will subsequently be explained in detail, the stem ejection cylinder 180 (FIG. 4), the piston 182, and this air passage (FIG. 5) perform an important function in minimizing damage to the stem end 86 of a pear 80, or other fruit, being stemmed in the subject apparatus.

Inasmuch as the stemming tubes 172 (FIG. 4) and the stem ejection cylinders 180 of all of the stemming units SU are secured to the main support bracket B, the tubes and cylinders move elevationally with the main bracket. The ejector rods 184, however, are mounted for elevational movement independently of the main bracket and their associated stemming tubes and ejection cylinders. For this purpose, an ejector support bracket 195, extending the full width of the conveyor C, has spaced upper and lower end portions 196 mounted for elevational slidable movement on the guide rods 124 respectively above and below the upper holders 137 for the main support bracket. Upper and lower cross members 198 and vertical bars 198a rigidly interconnect the end portions 196, and rearwardly extended, connecting blocks 197 on the upper cross member 198 are individually secured to the upper ends of the piston rods 187. Additionally, the ejector bracket has two pairs of lugs 199 (FIG. 1) which project rearwardly from the lower cross member 198 adjacent to opposite sides of the ejector bracket for use in lowering and lifting the ejector bracket, in a manner to be described.

When each stemming unit SU is at the stemming station 81, it is vertically aligned with a fruit supporting cup 55 in its associated lane of cups. To insure precise alignment of each stemming unit and a cup at the stemming station and to maintain this alignment throughout the stemming operation, pairs of elongated flight aligning rods 205 (FIG. 3) are provided adjacent to opposite sides of the carrier frame F. The rods are slidably received in lateral extensions 110' of the aligner mounting channels 110, in the upper mounting channel 150, in the lower mounting channel 114, and in lower rod guides 206 (FIG. 4), the latter being individually secured to the mounting panels 112 of frame F below the lower mounting channel 114. The rods have upper heads 208 above the extensions 110' of the aligner channels, lower ends 209 projecting below the rod guides 206 when the upper heads are in engagement with or closely adjacent to the aligner mounting channels 110, and collars 210 (FIGS. 3) urged into engagement with the upper mounting channel 150 by springs 212 encircling the rods. The springs have upper and lower ends respectively bearing against the lateral extension 110' and the collars of their respective rods. The lower ends 209 (FIG. 4) of the rods 205 move downwardly into the aligning holes 49 in each flight 48 of conveyor C when the stemming units SU are aligned with a row of cups 55 in such flight and the main support bracket B moves down. It is to be noted, however, that the rods yield upwardly against the urgency of the springs 212 if the lower ends of the rods are not aligned with the holes 49 and strike the flights.

As each stemming unit SU (FIG. 4) descends toward an aligned supporting cup 55 therebelow, the fruit seating and centering cup 164 is the first to engage (FIG. 5) the blossom end 85 of a pear 80 in the supporting cup. It is a feature of the subject apparatus that the seating and supporting cups 164 then move the pear into an upright position with its stem blossom axis coaxial with the stemming tube 172; the cups also hold the pear firmly in this axially upright position during the stemming operation. The angles 61, 62, and 166 of the cups are chosen so as to align and to hold the fruit with maximum effectiveness; optimum angles for pears are disclosed above. Ideally, the pears are peeled and wet so that surface friction between the pear and the cups is minimized.

Each fruit seating cup 164 is spring-urged downward (FIGS. 3 and 4) for holding each pear to be stemmed more dependably in properly seated position in its supporting cup 55. In effect, this is accomplished by pulling downwardly with spring tension on each lifter plate 162. Thus, a stud 220 projects radially outward from each lifter plate, and a seater spring 221 has an upper end connected to each stud. The springs hang downward from the studs and have lower ends attached to a spring anchoring bar 222 mounted transversely above the conveyor C, said bar having opposite ends adjacent to the panels 112. The springs, through the lifter plates, press the cushions 167 against the mounting channel 150 but, of course, the mounting channel and the main support bracket B of which the channel is a part, remain free to move down with respect to the cup 55.

In order to adjust the tension on the springs 221, and thus the pressure on the pears 80, the anchoring bar 222 is adjustably attached to the panels 112 of the carrier frame F. For this purpose, therefore, the panels 112 provide vertical slots 112' (FIG. 4) in alignment transversely of the conveyor C. An adjustment plate 223 is secured to each panel adjacent to the slot therein, and each plate provides notches 224 registering with an upper section of the associated slot. Pins 227 project from the ends of the bar and are slidably received in lower sections 227a of the slots. The bar is thereby mounted for guided elevational slidable movement toward and away from the studs 220.

In addition, arms 229 are rigidly connected to opposite ends of the bar 222 and project upward therefrom alongside their adjacent slots 112'. Handles 230 (FIG. 3), parallel to the bar 222, provide inner ends 231 connected to the arms and intermediate diametrically reduced portions projecting through their adjacent slots and adapted to be releasably fitted in selected notches 224. The handles also have outer enlarged portions on the outer sides of the panels 112.

To adjust the tension on the springs 221, therefore, the handles 230 are moved upwardly or downwardly through the slots 112' to bring their intermediate portions opposite to selected notches 224 whereupon they are moved rearwardly into said notches. It is evident that with the handles in the lowermost notches, the springs are under greater tension and apply a greater downward force on the lifter plates 162 and thus to the seating cups 164 than when the handles are in the uppermost notches.

*Coring units*

In addition to the stemming units SU, the several coring units CU (FIG. 3) which embody several very important features of the present invention, are supported on the main support bracket B and each coring unit is individually associated with one of the stemming units. The mounting of the coring units will be described first. A plurality of coring unit holders 240 (FIGS. 3 and 6), corresponding in number to the number of lanes of cups 55, are secured to the lower mounting channel 114 above their respective lanes and forward of the stemming units. Each coring unit holder 240 (FIG. 6) includes a vertical plate 240a which has a pair of spaced upright guide sleeves 241 mounted on the upper corners of its forward face, only one sleeve 241 being shown in FIG. 3. A lower abutment 242 projects forward beneath and between the guide sleeves, and a fastening lug 243 extend upward from the lower mounting channel back of the guide sleeves and the abutment.

Each pair of guide sleeves 241 (FIG. 3) of each coring unit holder 240 is in vertical, axial alignment with corresponding pairs of openings 119 in the upper guide bar 118. Coring unit slide rods 245 are individually slidably fitted in aligned openings 119 and guide sleeves 241 for elevational slidable movement relatively to the carrier frame F. A pair of these slide rods is provided for each lane of cups. A horizontal support plate 246 (FIG. 3) is secured to the upper ends of each pair of slide rods, and bonded to the undersurface of each plate 246 is a cushion 249 which rests on the coring unit support channel 140 of the main support bracket B. Therefore, the slide rods are moved up and down with the main support bracket when the support plate and cushion bear against the support channel 140.

One coring unit CU is secured to each pair of slide rods 245 for elevational movement therewith. Since all of the coring units are of identical construction, only one such unit is described in detail. Each coring unit (FIG. 7) includes an inverted dampening cylinder 252 providing an upper wall 253, a cylindrical side wall 254 circumscribing an open bottom 255, and a lateral tubular member 256 (FIG. 8) in the side wall. Upper and lower pairs of mounting ears 257 (FIG. 8) are extended radially forward from the cylinder 252 and are secured to the associated pair of slide rods 245 at a point between the upper guide bar 118 (FIG. 6) and the coring unit holder 240. Coring unit compression springs 258 (FIG. 6) encircle the slide rods 245 and have opposite ends bearing against the upper guide bar 118 and the ears 257 on the dampening cylinder 252. The purpose of these springs is to cushion upward movement of the coring unit and to overcome lag during initiation of its downward movement.

A dampening piston 260 (FIG. 7) includes a lower shank 261 connected to the fastening lug 243 of the adjacent coring unit holder by a pin 262. A centering rod 264 is secured to the dampening piston and is coaxially upwardly extended therefrom. The centering rod is also coaxially extended through the dampening cylinder 252 and slidably received in an opening in the upper wall 253 thereof. A cushion 266 is secured to the upper surface of the dampening piston in circumscribing relation to the centering rod.

Each coring unit CU also includes a generally cylindrical housing 270, constituting a mounting or supporting member. The housing has an upper, diametrically enlarged portion 271 and a cap 272 secured to the upper portion. The cap provides rear lateral projections 274 (FIGS. 6 and 8) which are releasably secured to the upper mounting ears 257 of the associated dampening cylinder 252, and the upper portion 271 of the housing has lower bosses 275 (FIG. 6) which are releasably connected to the lower mounting ears 257 of each cylinder. Since the ears 257 are secured to the slide rods 245, the dampening cylinder and the housing are mounted for elevational movement with the slide rods 245. In addition, the upper portion 271 of the housing has a forward protuburance 278 (FIG. 7) and a lower, internal annular ledge 279.

Further, the housing 270 of each coring unit CU also has a lower, diametrically reduced portion 285 terminating in a lower tubular end 286. An upper bearing 287 (FIG. 7) is mounted within the cap 272 and is concentric with the housing, and a lower bearing 288 is mounted with the lower portion 285 in coaxial alignment with the upper bearing. An annular water seal 290, preferably of the slinger type, is fitted within the housing below the lower bearing. Additionally, the housing has a flange 291 forwardly projecting from its lower portion, and a vertical guide bolt 292, for a purpose to be described, is threaded into this flange and is selectively adjustable therein.

In addition, each coring unit CU has a coring shaft 296 coaxially received with the housing 270 and rotatably journalled in the upper and lower bearings 287 and 288 for rotation within the housing. The coring shaft has an upper section 298 within the upper portion 271 of the housing and a lower tubular section 299 downwardly projecting from the upper section through the lower portion 285 of the housing.

The upper section 298 of each coring shaft 296 includes an upper driven end 305 fitted in the upper bearing 287 and upwardly projecting through the cap 272, an annular shoulder 306 in engagement with the upper bearing, an upper bore 307 opening into the lower section 299 of the coring shaft, a pair of diametrically opposed slots 308 opening into the upper bore, and a lower portion 309 received within the lower bearing 288 and having an external annular shoulder 310 in engagement with the water seal 290. Upper and lower snap rings 312 and 313 are connected in circumscribing relation to the upper section of the coring shaft respectively above the upper and lower bearings. Another snap ring 314 is connected inside of the housing 270 and also engages the upper surface of the lower bearing. In this manner, the coring shaft is rotatably journalled within the housing but is held against axial movement relatively to the housing.

The lower tubular section 299 of each coring shaft 296 includes a lower end 316 below the lower end 286 of the housing 270, a lower bore 317 diametrically larger than and communicating with the upper bore 307, and a pair of diametrically opposed lower slots 318 opening into the lower bore.

Still further, each coring unit CU includes an elongated coring knife 325 positioned within the lower tubular end of the coring shaft 296 in the plane of the slots 318 and pivotally connected to the shaft for movement in this plane. For this purpose, a knife-mounting pin 326 is extended transversely through the lower end 316 of the coring shaft and below the lower end 286 of the housing 270. A retaining ring 327 is fitted in an annular groove in the shaft underneath the pin for releasably retaining the latter in the shaft. The coring knife has an intermediate shank 328 positioned within the lower bore 317 and through which the mounting pin is passed. The knife also has an arm 329 projecting obliquely upwardly from the shank, said arm providing an endwardly opening camway 330 therein. A generally semi-elliptical blade 332 which terminates in a fruit penetrating end 334 is formed on the lower end of the knife. The arm 329 and the upper portion of the shank 328 are at the elevation of the slots 318 and move through or into said slots upon pivotal movement of the knife on the pin 326. Although the knife pivots with respect to the coring shaft, it rotates with the shaft.

It is of significance to the present invention that pivoting movement of each coring knife 325 is automatically controlled in accordance with the size of the fruit 80 being cored. Therefore, in order to control pivoting movement of the coring knife 325, each coring unit CU is provided with a knife actuating plunger 340 mounted within the coring shaft 296 for elevational reciprocating movement therein. The plunger includes a lower cylindrical block 341 which is slidably received within the lower bore 317 and has a transverse recess 342 receiving the arm 329 of the coring knife therewithin. A camming pin 344 is mounted in and extended transversely of the block and is slidably received in the camway 330. The plunger also includes a cylindrical stem 346 axially upwardly projecting from the block and slidably received in the upper bore 307.

Still considering how the pivoting of the coring knife 325 is controlled, an inner collar 350 circumscribes and is slidably fitted on the upper section 298 of each coring shaft 296. A bolt 351 is extended through the inner collar and the slots 308 and through the stem 346 of the plunger 340, and a nut 352 is connected to the bolt. Therefore, the inner collar 350 and the plunger 340 are axially slidable relatively to the coring shaft 296 but rotate with the coring shaft. An outer adjusting ring 354 circumscribes the inner collar and is connected thereto by a collar bearing 356. The adjusting ring has a front keyway 358 (FIG. 9) extending longitudinally thereof relatively to the coring shaft, and trunnions 359 project outward from the adjusting ring transversely of the coring shaft.

The collar bearing 356 (FIG. 7) of each coring unit CU includes inner and outer races 362 and 364, respectively, fixed to the inner collar 350 and to the adjusting ring 354, and balls 366 captured for rolling movement between the races. Therefore, the coring shaft 296 and the inner collar are rotatable within the adjusting ring, but the adjusting ring and the collar are unitarily movable axially on the shaft. Accordingly, as the adjusting ring 354 moves up and down on the shaft, the plunger 340 correspondingly moves up and down in the shaft so as to pivot the knife 325 as the camming pin 344 rides in the camway 330.

The plunger 340, collar 350, and adjusting ring 354 of each coring unit CU are moved up and down, that is, reciprocated axially, relatively to their coring shaft 296 in the following manner. A pivot pin 370 is extended through the protuberance 278 of each housing 270 in parallel relation to the trunnions 359 and has opposite ends projecting outwardly from the protuberance. An actuator control yoke 371 (FIG. 9), within each housing, has a central portion 373 secured to the pivot pin 370, a key 374 projecting rearward from the central portion and slidably received in the keyway 358 of the adjusting collar, and arcuate arms 376 projecting rearward from the central portion about the adjusting ring 354 and are forked to receive the trunnions 359. Rotation of the pivot pin thus causes the adjusting ring to move up and down.

For rotating the pivot pin 370, a knife actuating lever 378 is secured to an end of each pivot pin 370 by a set screw 379. The lever 378 (FIG. 6) is extended radially forward and upward from its housing 270 and is pivotally connected to the actuator support bar 147 of the main support bracket B by a telescopically adjustable link 380. Whenever the main support bracket B moves vertically relatively to one of the housings, therefore, the lever 378 for such housing rotates its pivot pin. It is important to note that such movement of the support bracket B relatively to a housing 270 causes the latter's plunger 340 to move axially in its coring shaft 296 and its coring knife 325 to pivot between a retracted position in substantially coaxial alignment with the coring shaft (FIG. 7) and a coring position in acute angular relation to the axis of the coring knife (FIG. 14 or 15). Conversely, it is important to note that as long as there is no relative elevational movement between the main support bracket and the housing, there is no pivotal movement of the coring knife. These features are used to advantage in controlling the pivoting of the knife in accordance with the fruit size, as will be seen.

In addition to a coring knife 325, each coring unit CU also provides a pair of calyx knives 388 (FIGS. 7 and 13). For mounting the calyx knives, each coring unit has a calyx knife holder 390 (FIG. 7) including an upper cylindrical portion 391 slidably received within the lower bore 317 of the coring shaft 296. The upper portion of the knife holder 390 has a transverse recess 393 receiving the shank 328 of the coring knife for movement therein. The upper portion of the knife holder also has a pair of elongated, longitudinally extended slots 395 (FIG. 12) disposed transversely of and on opposite sides of the recess 393 and receiving, the mounting pin 326 therein. The calyx knife holder is thus mounted for limited axial movement relatively to the coring shaft, which movement is limited by the engagement of the mounting pin 326 with the knife holder at opposite ends of the slot 395.

Each calyx knife holder 390 also includes a lower tubular portion 397 in circumferentially spaced relation to the shank 328 of the coring knife 325 and an annular flange 398 projecting radially outward from said lower portion. The calyx knives 388 (FIGS. 7 and 13) in each holder are mounted within the lower portion 397 of the holder on opposite sides of the coring knife and in a common plane with each other. The calyx knives, therefore, can move axially of the coring shaft 296 (FIG. 7) and the coring knife but rotate with the latter.

Each coring unit CU also includes a cylindrical, depth gauging or control sleeve 405 which is slidably fitted on the lower portion 285 of the housing 270 for axial movement thereon. The sleeve has an upper end portion 406, an ear 408 projecting outward from the upper end portion and slidably receiving the guide bolt 292, and a lower end portion 409. The lower portion of the sleeve has an internal annular shoulder 410, upper and lower access openings 412 and 413, and a lower liquid inlet port 414. A flushing conduit 416 is connected to each inlet port and has an opposite end connected to a water manifold 417 (FIG. 6).

Each depth gauging sleeve 405 (FIG. 7) is connected to its calyx knife holder 390 by an upper washer 420 seated against the shoulder 410 and in engagement with the upper surface of the flange 398, a lower washer 421 positioned against the lower surface of the flange, and an intermediate spacing washer 422 positioned between the upper and lower washers and between the sleeve and the flange 398. Each sleeve includes an annular depth gauging or control ring 425 fitted in the lower end portion 409 in engagement with the lower washer and held in this position by bolts 426 radially extended through the sleeve and the ring. The ring also has an access opening 425' and a liquid inlet port, not shown, in registration with the lower openings 413 and 414. The depth gauging ring provides a lower, downwardly divergently projecting fruit engaging surface 427 terminating in a lower edge 428.

Further considering each depth gauging sleeve 405, a pair of upper spring bearing lugs 435 (FIG. 10) are diametrically outwardly extended from the upper end portion 406 and are circumferentially offset from the ear 408. Upper and lower guide lugs 436 (FIGS. 10 and 11) are radially outwardly extended from the sleeve in vertical alignment with each other in a plane displaced ninety degrees from the plane of the spring bearing lugs 435. Upper and lower dampener guide ears 438 (FIGS. 10 and 12) are extended outward from the sleeve, in diametrically opposite relation to the upper and lower guide lugs 436, respectively. A dampener control block 440 (FIGS. 6 and 11) is radially extended from the sleeve 405 between the upper and lower dampener guide ears 438. This block includes a longitudinal bore 441 (FIG. 6) aligned with the guide ears and a lateral port 442 communicating with the bore and opening radially outward through the block.

Three upright mounting rods 446 (FIGS. 10 and 11) are respectively slidably received in the upper and lower guide lugs 436 and in the upper spring bearing lugs 435. An upright dampener control rod 447 is slidably received in the guide ears 438 and in the longitudinal bore 441 of the control block 440. The mounting and control rods 446 and 447 (FIG. 6) are parallel and project downward from the sleeve 405, and a fruit centering ring 449 is secured to the lower ends of these rods in concentric relation with the sleeve. The centering ring (FIG. 7) has an inner, downwardly diverging frusto-conical fruit engaging surface 450; this surface is at an angle of approximately forty-five degrees with a vertical but, as with the cups 55 and 164 (FIG. 5), the invention is not limited to the specific angle referred to. In addition, the ring 449 (FIG. 7) has upper mounting lugs 451. Compression springs 453 (FIG. 13) encircle two of the mounting rods 446 and have upper ends (FIGS. 6 and 7) bearing against their respective lugs and lower ends engaging the lugs of the centering ring. In this manner the centering ring is yieldably urged downwardly away from the sleeve. The purpose of the springs is to provide enough force to center and hold the fruit 80 in the cup 55 for coring as well as to cushion the initial shock upon engagement of the centering ring with the fruit.

For each coring unit CU, an arcuate centering ring stop plate 454 (FIGS. 7 and 10) and a cushion 455 are slidably fitted on a pair of adjacent mounting rods 446 between circumferentially adjacent upper spring bearing and guide lugs 435 and 436 and the heads of said mounting rods 446. The cushion is in vertical opposition (FIGS. 6 and 7) to the abutment 242 of the coring unit holder 240 associated with its respective coring unit. When the cushion engages its abutment, further downward movement of the centering ring 449 is prevented. Therefore, if there is no fruit 80 in a cup 55 (FIG. 6), the centering ring is prevented from striking the cup by such limiting of the downward movement of the ring.

Each dampener control rod 447 also serves as a cushioning or dampening control for its respective coring unit CU and includes a lower portion 456 of a predetermined large diameter and an upper portion 457 of a diameter smaller than that of the lower portion. The diameter of the lower portion is just slightly less than the diameter of the longitudinal bore 441 in the dampener control block 440 so as to permit sufficient clearance for the lower portion to slide through the bore. The diameter of the upper portion of the control rod is, therefore, somewhat less than the diameter of the bore so that when the upper portion is within the bore, an annular air passage 458 is defined between the rod and the block.

A nipple 465 is threaded into the lateral port 442 of each block 440. A union 466 is directly connected to the nipple and is connected to the lateral tubular member 256 of the dampening cylinder 252 by a hose 468. Also, an outer fitting 470 providing a restricted air duct 471 is connected to the union and thus communicates with the hose and the nipple.

As previously mentioned the seed cell cavity in small fruit is closer to the butt end of the pear than is the seed cell of large fruit. Accordingly, it is an important feature of the present invention to provide a mechanism whereby the coring knife 325 will not be projected as far below the gauge ring 425 when a small pear is in a cup 55 as when a large pear is in that cup.

Accordingly, a control linkage is connected to the sleeve 405 of each coring unit so that the axial spacing between the fruit penetrating end 334 of each coring knife 325 and the fruit engaging edge 428 of its depth gauging ring 425 is automatically controlled in accordance with the size of the fruit 80 being cored. Specifically, cam followers 475 are diametrically outwardly extended from the upper end portion 406 of each sleeve 405 at approximately the same elevation as the upper dampener guide ear 438. These followers are displaced ninety degrees from the ear 408 receiving the guide bolt 292. Coaxial pivot pins 477 (FIGS. 6 and 10) are secured in the sleeve 405 by setscrews 476 and are diametrically outwardly extended from the housing in a common vertical plane with the cam followers.

Depth control cam plates 478 are individually mounted on the pivot pins 477 for pivotal movement about an axis which extends transversely of the housing 270. Each plate has a camming slot 479 (FIG. 6) receiving a cam follower 475 and including a first section 480 and a second section 481. The first section of each camming slot has opposite upper and lower edges 482 concentric with the pivot pins 477. The second section of each camming slot has opposite upper and lower edges 484 eccentric to the pins 477. The radial spacing between each edge 484 and the pivot pins 477 progressively increases from the first sections to the outer end 486 of each slot.

With the cam followers 475 in the first sections 480 of the slots 479 during pivotal movement of the plates 478, there is no movement of the sleeve 405 axially on, that is with respect to, the housing 270. With the cam followers in the second sections 481 of the slots (FIG. 14 or 15), pivotal movement of the cam plates causes the sleeve to move axially on the housing between an uppermost position (FIG. 14), wherein the cam followers are relatively adjacent to the first sections of the slots, and a lower position (FIG. 15) wherein the cam followers abut the outer ends 486 of the slots.

For controlling pivoting of the cam plates 478, each coring unit CU has a depth control yoke 490 (FIG. 10), which includes a pair of arms 491 individually secured to the cam plates by a capscrew 491a, a central portion 492 interconnecting the arms, and an elongated lever 493 rigidly connected to the central portion and projecting forward (FIG. 14) from the housing 270. The cam plates are pivoted in response to elevational movement of their lever.

In order to pivot the levers 493 associated with all of the coring units CU in the subject apparatus, brackets 496 are secured to the lower side channels 100 and extend downward therefrom. A control shaft 497 has opposite ends journalled in the brackets and is extended transversely of the conveyor C and of the carrier frame F. Links 498 are secured to the shaft 497 in longitudinally spaced relation therealong and are individually pivotally connected by pins 499 to their respective levers 493. As each coring unit travels downwardly, its cam plates 478 are pivoted by its lever 493 so that during an upper part of such travel (just in advance of the FIG. 14 position), the cam followers are in the first sections 480 of the slots 479 and the penetrating end 334 of the coring knife 325 is in maximum spaced relation to the edge 428 of the ring. If the coring unit moves down far enough, the cam followers move into the second sections (FIG. 14), and the edge 428 progressively moves closer (FIG. 15) to the penetrating end as downward movement of the coring unit continues. The edge 428 and said penetrating end are closest together when the cam followers abut the outer ends 486 of the slots. Accordingly, it will be evident that if a small pear is in the cup, as seen in FIG. 15, the coring knife will not project as far out of the gauge ring 425 as when a large pear is in the cup, as indicated in FIG. 14.

It is evident, therefore, that as the pears 80 (FIG. 6) are moved in the direction of arrow 73 by the conveyor C, they are successively stemmed and cored by the stemming and coring units SU and CU, respectively. The portions of the pears which are cut out by these units and the flushing water which is sprayed from the coring unit are collected in a drain pan 505 (FIG. 2) mounted in the main frame 25 between the upper and lower runs 70 and 71 and below the stemming and coring stations 81 and 82.

Fruit lifter

After the pears 80 are cored, they continue their travel in the conveyor C toward the forward drive shaft 41. In order to unseat or lift the pears from the fruit supporting cups 55, the fruit lifter L comprises pivot brackets 510 (FIGS. 2 and 3) which are individually secured to the lower mounting panels 112. These brackets project downward from the mounting panels and are outwardly spaced from the side braces 30. The fruit lifter L also includes arms 512 having rear ends individually pivotally connected at 513 to the pivot brackets and front ends interconnected by a central angle iron 515 extending underneath the upper run 70 of the conveyor forward of the coring station 81 and relatively adjacent to the forward drive shaft. A holding bar 516 is mounted on the central angle iron, and a plurality of fruit lifting fingers 518 project upward from the holding bar in alignment with the lanes of cups 55; that is, the number of fingers is the same as the number of lanes. Further, the fruit lifter includes wings 519 extending laterally outward from the arms adjacent to the central angle iron.

The fruit lifter L is elevationally oscillated by a lifter rockshaft 525 (FIG. 2) journalled in the main frame 25 in bearing 526 secured to the front legs 26 immediately below the side brackets 29. An angulated fruit lifting lever 528 is secured to the rockshaft 525 adjacent to an end thereof. The lifting lever has a rear portion 529 individually pivotally connected to the wing 519 by a generally upstanding link 530 and an upper portion 532 mounting a cam follower 533 (FIG. 1).

Cam control and operation

In order to control the conveyor C (FIG. 1), the carrier frame F, the main support bracket B, the stemming units SU, the coring units CU, and the fruit lifter L (FIG. 2), a camshaft 540 (FIGS. 1 and 2) is journalled in the main frame 25 in a substantially horizontal position adjacent to the front legs 26 and above the side braces 29. The camshaft has a driven end 541 (FIG. 1) which is coupled to the main drive motor 542 by a speed-change mechanism 543 and a pulley-belt drive 544. The camshaft also has a driving end 546 to which is secured a driving bevel gear 547.

For driving the conveyor C, an inclined, intermediate shaft 550 (FIG. 2) is journalled in bearings 551 secured to the main frame 25 on the same side thereof as the driving bevel gear 547. An upper driven bevel gear 553 is secured to the upper end of the intermediate shaft and is in mesh with the driving bevel gear. A lower drive bevel gear 555 is secured to the lower end of the intermediate shaft and is in mesh with the driven bevel gear 44 associated with the fruit conveyor. Accordingly, when the camshaft is rotated by the drive motor 542, movement in direction 73 is imparted to the conveyor. In an actual embodiment of the invention, each flight 48 (FIG. 1) moves a distance of four inches, that is, the distance between adjacent cups 55 in each lane, for each revolution of the camshaft, it being understood that the invention is not limited to this precise relationship.

In order to oscillate the carrier frame F, a carrier frame cam 560 (FIG. 1) providing an annular cam track 561 is secured to the camshaft 540. A carrier control lever 562 provides a lower end 563 secured to the front rockshaft 93 and an upper end 565 mounting a cam follower 566 located in the cam track of the carrier frame cam. As the camshaft rotates, the rockshaft 93 is oscillated in opposite directions by the carrier cam thereby to swing the carrier frame F forwardly and rearwardly. More specifically, the oscillating cycle of the carrier frame is best understood by the carrier frame curve in FIG. 16 and by reference to FIG. 2. At the zero degree abscissa point on the carrier frame curve, the carrier frame is just advanced from its rearwardmost position with the stemming and coring units SU and CU in vertical alignment with a pair of rows of fruit supporting cups 55. From zero degrees to just slightly more than two hundred and eighty degrees, the carrier frame swings forwardly at a constant velocity equal to the velocity of forward travel of the upper run 70 of the fruit conveyor C. From just before the three hundred degree point to about three hundred and fifty degrees, the carrier frame swings rearwardly, and then, at about three hundred an fifty degrees, the carrier frame starts its forward movement again. As the carrier frame swings rearwardly and starts its forward travel, the upper run of the conveyor continues to move forwardly so that the stemming and coring units are repeatedly indexed over successive pairs of spaced rows (indicated by X in FIG. 6) of cups holding pears 80 to be stemmed and cored.

In order to control the elevational movement of the stemming unit SU, a pair of stemming tube cams 570 (FIG. 1) are mounted on the camshaft 540 on opposite sides of the carrier frame cam 560. Each of the stemming tube cams has an annular cam track 571. A stemming tube rockshaft 573 (FIGS. 1 and 2) is journalled in the main frame 25 in rearwardly upwardly spaced, substantially parallel relation to the camshaft. Stemming tube lifting levers 575 are secured to the stemming tube rockshaft and include cam end portions 576 projecting forward over the camshaft and rearwardly projecting unit end portions 577. Cam followers 578 are individually mounted on the cam end portions and are individually received in the cam tracks 571 of the stemming tube cams. Adjustable hanging links 579 (FIG. 1), which have adjustable eye members threaded on each end, are pivotally connected at their upper ends to the unit end portions of the lifting levers and individually pivotally connected at their lower ends between the pairs of spaced ears 143 (FIGS. 1 and 3) on the coring unit support channel 140 of the main support bracket B. Therefore, as the rockshaft 573 (FIG. 2) is oscillated in response to rotation of the camshaft 540, the main support bracket B is moved up and down on the guide rods 124 (FIG. 3). The direct effect of lowering the main support bracket is to lower each seating cup 164 against a pear in a cup 55 and then to thrust the stemming tube 172 downwardly through the pear; lifting the bracket B withdraws the tube and lifts the seating cups. Indirectly, however, this elevational movement of the main support bracket also controls the movement of the coring unit CU since the latter is supported on the channel 140. The cam-controlled travel of the stemming tube, as illustrated by the stemming tube curve in FIG. 16, will be specifically discussed but prior thereto, attention is briefly directed to the control of the stem ejector rod 184 (FIG. 4).

A stem ejector cam 585 (FIG. 1) is secured to the camshaft 540 between one of the stemming tube cams 570 and the carrier frame cam 560, it being noted that the ejector cam also has an annular cam track 586. A horizontal ejector rockshaft 588 is journalled in the main frame 25 in forwardly and upwardly spaced parallel relation to the stemming tube rockshaft 573. Outer unit support arms 589 have front ends rigidly connected to the rockshaft 588 and rear ends individually pivotally connected to the pairs of lugs 199 (FIGS. 1 and 3) on the ejector bracket 195 by support links 590. A cross brace 592 (FIG. 1) rigidly interconnects the pivot support arms for imparting rigidity thereto. A stem ejector lifting lever 593 is secured to the stem ejector rockshaft between the unit support arms and includes a forward portion 594 mounting a cam follower 595 received in the cam track 586 and a rear portion 597 secured to the cross brace 592.

As is believed understood, oscillation of the rockshaft 588 upon rotation of the camshaft causes elevational movement of the ejector bracket 195. The elevational movement of the ejector bracket, and thus the stem ejector rod 184 (FIG. 4), in relation to the stemming tube 172 is of particular significance and is discussed at this point.

With reference to the chart in FIG. 16 and to FIGS. 4 and 5, and assuming the stemming unit SU is in vertical alignment with a cup 55 supporting a pear 80 to be stemmed, the stemming tube cams 570 (FIG. 1) cause the stemming tube 172 (FIG. 4) and thus the seating cup 164 to move downwardly toward the pear, it being noted that when the carrier frame F is at its rear zero degree position, the stemming tube has already begun its downward movement. The seating cup first engages the pear, and the cooperative engagement of the cup walls 58 and 165 with the pear centers and seats the pear in the cup 55; the springs 221 aid in seating the pear and in maintaining such seating during the stemming action. Further downward movement of the cup 164, the shank 163 and the lifter plate 162 is thereby arrested. The stemming tube continues downward and, when the carrier frame is at its one hundred and forty degree position, the stemming tube has moved through the lower opening 58' (FIG. 5) in the cup 55 and, therefore, has cut completely through the pear around the stem 89 thereof and has emerged through the stem end 86. The stemming tube continues to travel even farther downwardly, reaching its lowermost point when the frame has advanced to approximately its one hundred and seventy degree position (FIG. 16). The stemming tube is then moved upwardly, it being noted that as the stemming tube is being withdrawn from the pear, the seating cup holds the pear in the cup to prevent its being lifted by the tube. When the mounting channel engages the cushion 167, the seating cup moves up with the stemming tube. The tube remains at an upper dwell from about three hundred to about three hundred and forty degrees while the carrier frame swings rearwardly. The stemming tube starts its next movement downwardly at about three hundred and forty degrees as the carrier frame starts to move forwardly.

Considering the ejector rod curve in FIG. 16, the ejector rod 184 (FIG. 4) is moved downwardly by the ejector cam 585 (FIG. 1) at approximately the same rate (FIG. 16) as the stemming tube 172 (FIG. 4) until just after the stemming tube penetrates the pear 80; this point is represented on the cam chart in FIG. 16 by the thirty degree position of the carrier frame F. From approximately thirty degrees to approximately one hundred and forty degrees, the ejector cam moves the ejector rod upwardly relative to the downwardly moving stemming tube. The rather abrupt upward movement of the piston 182 (FIG. 4), which is attached to the ejector bracket 195, with respect to the downward movement of the cylinder 180, which is attached to the stemming tube, creates a partial vacuum in the cylinder below the piston and in the annular air passage 189 (FIG. 5) between the stemming tube and the ejector rod. This partial vacuum is created during the time the stemming tube is moving through the stem end 86 of the pear. By reducing the pressure below atmospheric pressure internally at area 89' on the central core of fruit including the stem 89, as the stemming tube cuts through the pear and separates this core from the fruit, the stem end of the pear is held upwardly against and integral with the pear. Therefore, the stemming tube cuts a clean cylindrical core of fruit out of the pear and does not break off the stem end of the fruit.

With the subject invention, the stemming tube 172 can be sharpened as at 176, 177 on the outside of the tube rather than on the inside and therefore can be made more economically than if inside sharpening were necessary. Prior to the subject invention, however, inside sharpening was resorted to in order to minimize lateral forces exerted by the stemming tube on the stem end portion 86 of the fruit 80. Although the beveled surface 176 does impose some outward force on the stem end of the fruit, this force is more than counteracted by the described suction applied at 89' to the stem end portion.

After the stemming tube 172 is all the way through the pear 80, the stem ejector cam 585 (FIG. 1) moves the ejector rod 184 (FIG. 4) downwardly relatively to the stemming tube from the one hundred and seventy degree position (FIG. 16) to about the two hundred and twenty degree position of the carrier frame F. Thus, the cylindrical core of fruit including the stem 89 within the stemming tube is forced out of the stemming tube by the ejector rod, whereupon the core falls into the drain pan 505 (FIG. 2). Therafter, the stem ejector rod is moved upwardly and also experiences a dwell period (FIG. 16) along with the stemming tube before it starts its downward travel again.

As indicated above, elevational movement of the coring units 238 (FIG. 1) are controlled by the stemming tube cams 570. However, for rotating the coring knives 325 (FIG. 2), a coring knife motor 600 is mounted on the platform 34. The coring knife motor is coupled to the upper driven ends 305 (FIG. 7), of the coring shafts 296 by separate flexible shafts 601 (FIGS. 1 and 7).

In describing the operation of one of the coring units CU (FIG. 14), it is assumed that the coring unit is in vertical alignment with a pear 80 to be cored in a cup 55 and that the coring shaft 296 (FIG. 7) and coring knife 325 are rotating. As the main support bracket B moves downwardly (FIG. 3), it lowers the coring unit since the weight of the latter is borne by the channel 140 of said bracket. The centering ring 449 (FIG. 14) is the first part of the coring unit to engage the pear, and it does so at the blossom end 85, axially centering and holding the pear in cooperation with the cup 55, as above described.

Initial engagement of the coring unit CU with the pear 80 is cushioned by the springs 453 and also by the dampening cylinder 252. The latter operates in this manner: During initial downward movement of the coring unit, the dampening piston 260 is outside (FIG. 6) of the dampening cylinder and the upper portion 457 of the dampener control rod 447 is within the dampener control block 440 so that no dampening of downward movement is imposed. About three quarters of an inch before the centering ring 449 contacts the pear, the piston enters the cylinder and forces air out of the port 256, and the lower portion 456 of the control rod enters the block. Since the lower portion of the control rod substantially fills the longitudinal bore 441 in the block, substantially all of the air forced out of the dampening cylinder by the piston flows from the hose 468 through the union 466 and the restricted air duct 471 of the outer fitting 470. Therefore, since movement of air out of the cylinder 252 by the piston 260 is restricted, downward movement of the coring unit is resisted so as to prevent crushing of the pear by sudden impact of the weight of the coring unit.

After the centering ring 449 contacts the pear 80, the housing 270 and the depth gauging sleeve 405 still continue to move downward because of the continued downward travel of the main support bracket 135, thereby compressing the springs 453 (FIG. 14) and inserting the knife 325 into the bore of the pear, said bore having been provided by the stemming tube 172 (FIG. 4) at the stemming station 81. During the downward travel of the coring unit as described so far, the knife is in its retracted position (FIG. 7) since there has been no relative movement between the main bracket and the coring unit, and therefore, there has been no pivotal movement of the knife actuating lever 378 relative to the housing.

As previously emphasized, the location of the knife 325 axially within the pear 80 and the extent of outward pivoting of the knife within the pear depend on the size of the pear and are two of the most important functions performed by the subject apparatus. It will be evident, particularly by comparing FIGS. 14 and 15, that the blossom end 85 of a pear that is relatively long or has a large diameter projects farther upward from the cup 55 (FIG. 14) than the blossom end of a pear that is relatively short or has a small diameter (FIG. 15). In fact, the blossom end of a small pear may even be below the upper rim of the cup, as in FIG. 15.

If the pear is relatively large (FIG. 14), for example, the cam followers 475 just barely enter the second sections 481 of the camming slots 479 during continued downward movement of the housing 270 and sleeve 405, causing the lower edge 428 and the fruit engaging surface 42 of the sleeve to move slightly toward the penetrating end 334 of the coring knife 325 by a fraction of an inch. When the fruit engaging surface 427 rests against the blossom end 85 of the pear 80, therefore, the knife projects relatively deeply into the pear so that it is fitted within the seed cell 87 of the large pear.

If a relatively small pear 80 is in the cup 55 (FIG. 15) the cam followers 475 move farther onto said second slot sections 481 and may even move into engagement with the outer ends 486 of the camming slots 479 whereupon the lower edge 428 and the fruit engaging surface 427 move closer to the penetrating end 334 of the knife 325. In this instance, when the fruit engaging surface rests against the blossom end 85 of the pear, the knife projects only a slight distance into the pear but is correspondingly fitted within the seed cell of the small pear. From this description, it is evident that the amount of movement permitted by the depth control sleeve 405 relative to the knife is predetermined in the design of the slots 479, the cam followers 475, the levers 493, and associated structure, to correspond to the locations of the seed cells within the usual sizes of the pears being processed.

After the knife 325 is located in the proper axial position with respect to the pear 80, it is necessary to swing, or expand, the knife outwardly so that it can cut out the seed cell 87. Since larger pears have larger seed cells than smaller pears, it is necessary to swing the knife farther out in large pears than in small pears. To understand how the subject apparatus swings the knife out just the proper amount, it is first to be noted that if a large pear is being processed, the downward travel of the housing 270 is stopped sooner than when a small pear is being processed because in the former instance, the surface 427 of the sleeve 405 contacts the pear sooner. Thus, just as soon as downward movement of the housing is stopped, the knife actuating lever 378 swings downwardly relatively to the housing since the lever's downward pivoting movement follows downward movement of the main support bracket B (FIG. 6), it being noted that said support bracket continues to move downwardly after the housing has stopped its downward movement. The important point to understand is that since the housing stops sooner with large pears than with small pears, the knife actuating lever swings through a greater arc with large pears than it does with small pears. This can be visualized in FIGS. 14 and 15 by comparing the angles of the lever 378 with the horizontal channel 100. The net result, therefore, is to impart greater pivotal movement to the knife with larger pears than with smaller pears. Once again, the apparatus is initially designed to provide pivotal movement of the knife in accordance with the usual sizes of fruit being processed.

The knife 325 is rotating continuously during the foregoing operations so that when it is properly positioned in the pear 80, as above described, it cuts out the seed cell 87 thereby cleaning out its cavity 88. The calyx knives 388 simultaneously cut out the calyx in the blossom end 85 of the pear. Preferably, the knife is rotated approximately fifteen times after it is properly fitted within the seed cell; the subject invention is not, however, limited to any specific number of rotations.

During the time that the coring knife 325 is cutting and cleaning out the seed cell 87 of the pear 80, water is sprayed onto, and into the bore of, the pear through the liquid inlet port 414 (FIG. 7) and between the calyx knife holder 390 and the depth gauging ring 425. The water flushes out and cleans the bore of the fruit of all loose seed cells and fruit fragments which thereafter drop into the drain pan 505 (FIG. 2).

The coring knife 325 (FIG. 6) is then retracted and withdrawn from the pear 80 by upward movement of the main support bracket 135. During initial upward travel of the support bracket, the knife actuating lever 378 pivots upwardly and returns the coring knife to its retracted, axially aligned position. When the channel 140 (FIG. 3) engages the cushions 141 on the support plates 246, the housing 270 is lifted upwardly and withdraws the knife from the pear and eventually moves the centering ring 449 out of fruit engagement. The coring unit CU is lifted into its uppermost position while the carrier frame F swings rearwardly so that when the coring unit is vertically aligned with another pear 80 to be cored in its row of pears, said coring unit is ready to repeat its downward movement with the main support bracket 135.

After the pears 80 have been cored at the coring station 82, they advance on the conveyor C toward the forward shaft 41 (FIG. 2). As each row of pears moves over the fingers 518, these fingers are momentarily lifted upwardly into engagement with the pears to lift the latter and unseat the same from their respective cups 55. In order to control upward and downward movement of the lifting fingers, a fruit lifting cam 610 (FIG. 1) is secured to the camshaft 540 adjacent to one of the stemming tube cams 570. The fruit lifting cam has an annular track 611 receiving the cam follower 533 therein. As the camshaft rotates, the fruit lifting cam rocks the lever 528 thereby to raise and to lower the fruit lifter L (FIG. 2). Therefore, as each row of cups 55 moves over the fingers, the latter are raised and lowered into and out of the lower openings 58' of the cups. In this manner, when the processed fruit 80 reaches the forwardmost end of the conveyor C, it is readily discharged from the conveyor.

Summary of operation

In briefly summarizing the operation of the present invention, the motors 542 and 600 (FIG. 1) are energized and whole, preferably peeled and slippery-surfaced pears 80 are placed, stem ends down, in all of the cups 55 as the latter move along the conveyor support portion 35 (FIG. 2). As a row of cups filled with unstemmed pears moves into the stemming station 81, the stemming units SU are vertically aligned or indexed with the cups in said row by the carrier frame F. Simultaneously, uncored pears in a forward row of cups are at the coring station 82 where the coring units CU are vertically aligned with the cups in said forward row. At this instant the carrier frame is at its rearwardmost position. An instant later, the carrier frame is moved forwardly at the same velocity as the conveyor C.

As the carrier frame F moves forwardly with the conveyor C, the main support bracket B is moved downwardly to project the flight aligning rods 205 through the holes 49 (FIG. 3) and to bring the seating and centering cups 164 (FIG. 5) into engagement with unstemmed pears 80 thereby axially centering these pears in their cups 55. At about the same time, the centering rings 449 (FIG. 14) are brought into engagement with, and axially center the uncored pears, this engagement being cushioned and dampened as described.

Next and in succession, the stemming tubes 172 (FIG. 5) are forced through the unstemmed pears 80, the pistons 182 (FIG. 4) are moved upwardly to apply suction at points 89' (FIG. 5) and thus on the stem ends 86 of the pears, and thereafter the ejector rods 184 are moved downwardly relatively to the tubes to eject the cut-out stem segments from the tubes. Substantially simultaneously, the coring knives 325 (FIG. 14) enter the stemmed but uncored pears to the locations of the cells 87 and expand, both the depth or extent of entry and the expansion corresponding to the sizes of the respective pears, thereby to cut out the cells from the pears. All of the fruit material which is removed from the pears is discharged into the drain pan 505 (FIG. 2).

Just before the carrier frame F reaches its forwardmost position, all of the stemming tubes 172 and the coring knives 325 are withdrawn from their respective pears 80. The carrier frame then swings rearwardly to index with following rows of cups 55 and to repeat the action above described. As the cored rows of pears advance, they are lifted from the cups 55 by the fingers 518 and are finally discharged from the conveyor C.

From the foregoing it will be evident that the subject apparatus stems and cores fruit accurately and without damaging the fruit. During stemming of the fruit, the apparatus holds the stem ends of the fruit intact with the fruit by applying suction thereon internally of the fruit thereby avoiding stem end breakage. It is clear, therefore, that apparatus embodying the principles of the present invention offers several significant advantages.

Although a preferred embodiment of the present invention has been shown and described, it will be understood that the various changes and modifications may be made in the details thereof without departing from the spirit and the scope of the appended claims.

What is claimed is:

1. A method of providing a hole in fruit which hole opens outward from the fruit through first and second surface portions spaced from each other on the periphery of the fruit comprising the steps of cutting an annulus in said fruit from said first portion to said second portion which annulus separates an elongated segment of the fruit from the remainder of the fruit therearound, said cutting being initiated in said first portion and advancing in the fruit toward and through said second portion, and applying a pulling force to the end of said segment adjacent said first surface portion in a direction opposite to the direction of advance of said cutting action while so cutting through said second portion to maintain integrity of the fruit about said second portion until said annulus is entirely cut through said fruit at said second portion.

2. A method of providing an axial hole in fruit having opposite stem and blossom end portions and a stem-blossom axis comprising the steps of cutting into said fruit at its blossom end portion and in circumscribing relation to its stem-blossom axis and thence cutting axially of said fruit to partially separate an axial portion of said fruit from the remainder of the fruit, and sucking on the partially separated axial portion adjacent to said blossom end portion to draw said stem end portion inwardly of the fruit as said cutting advances toward said stem end portion to prevent irregular separation of said stem end portion from the fruit and to insure separation of said axial portion in a substantially cylindrical shape throughout its length.

3. An apparatus for cutting a hole through fruit comprising a frame, means mounted in said frame for supporting fruit, a hole cutting tube, means mounting said tube in said frame for movement toward said supporting means and into engagement with fruit thereon, powered means connected to said mounting means for moving said tube toward said supporting means for forcing the tube through said fruit whereby said tube circumscribes a segment of said fruit separated from the remainder of the fruit by said tube, and means communicating with said tube for applying suction to said tube during its movement through said fruit to pull on said segment in a direction opposite to the direction of movement of said tube through said fruit thereby to prevent irregular breakage of the portion of the fruit in advance of said tube as said tube emerges from said fruit through said portion.

4. An apparatus for stemming fruit, having opposite blossom end and stem end portions and a stem-blossom axis, comprising a frame, means in said frame for supporting fruit, a stemming tube having a fruit penetrating end, a cylinder connected to said tube and coaxially projecting therefrom in a direction opposite to the direction in which said penetrating end projects, a piston mounted in said cylinder for reciprocation therein, a stem ejection rod connected to said piston and projecting into said stemming tube for reciprocation therein concurrently with reciprocation of said piston, means mounting said tube in said frame with said penetrating end directed toward said supporting means and for movement of said tube along a path coaxial with said tube and passing through said supporting means, said fruit being positioned in said supporting means with its blossom end portion facing said penetrating end and in coaxial relation to said path, first powered means connected to said mounting means for thrusting said penetrating end into and through a fruit on said supporting means whereby said tube circumscribes the axis of the fruit and separates an axial segment of the fruit from the remainder thereof, and second powered means connected to said piston for operating said piston so as to create a suction between said piston and said axial segment within said tube during movement of said tube through said fruit and thereafter for operating said rod so as to eject said segment from said tube.

5. In a fruit processing apparatus, a frame, a substantially horizontal conveyor mounted in said frame for supporting the fruit to be processed, a bracket mounted in said frame above said conveyor for movement toward and away from said conveyor, a fruit processing unit including a cutting portion mounted on said bracket for movement therewith into and out of engagement with fruit on said conveyor and a fruit seating portion movable around the cutting portion and relatively to the bracket for engaging and holding fruit in said conveyor as the fruit is cut by said cutting portion, and means coupling said frame and said seating portion for resisting movement of said seating portion out of engagement with the fruit when said cutting portion moves out of such engagement, said bracket being engageable with said seating portion as said bracket moves away from said fruit thereby to move both of said cutting and seating portions away from said fruit.

6. An apparatus for cutting a hole through fruit comprising a frame, means mounted in said frame for supporting fruit, a hole cutting tube, means mounting said tube in said frame for movement toward said supporting means and into engagement with fruit thereon, powered means connected to said mounting means for moving said tube toward said supporting means for forcing the tube through said fruit whereby said tube circumscribes a segment of said fruit separated from the remainder of the fruit by said tube, means for applying a pulling force on the end of said segment opposite said supporting means, the pulling force being in a direction opposite to the direction of movement of said tube while being moved toward said supporting means so as to prevent said tube from breaking off a portion of the remainder of said fruit as said tube passes through said fruit, and means for ejecting said segment from said tube after being separated from the remainder of said fruit.

References Cited

UNITED STATES PATENTS

| | | | |
|---|---|---|---|
| 1,463,114 | 7/1923 | Bostrom | 146—52 |
| 2,252,951 | 8/1941 | Urschel et al. | 146—52 |
| 2,346,561 | 4/1944 | Delay | 146—52 X |
| 2,567,591 | 9/1951 | Ashlock | 146—19 |
| 2,943,346 | 7/1960 | Jensen | 146—52 X |
| 3,057,386 | 10/1962 | Massaro | 146—6 X |
| 3,111,972 | 11/1963 | Anderson et al. | 146—52 X |

W. GRAYDON ABERCROMBIE, *Primary Examiner.*